(12) United States Patent
DiSorbo

(10) Patent No.: US 7,321,607 B2
(45) Date of Patent: Jan. 22, 2008

(54) EXTERNAL OPTICS AND CHAMBER SUPPORT SYSTEM

(75) Inventor: David DiSorbo, La Mesa, CA (US)

(73) Assignee: Cymer, Inc., San Diego, CA (US)

( * ) Notice: Subject to any disclaimer, the term of this patent is extended or adjusted under 35 U.S.C. 154(b) by 116 days.

(21) Appl. No.: 11/304,118

(22) Filed: Dec. 15, 2005

(65) Prior Publication Data

US 2007/0098033 A1     May 3, 2007

Related U.S. Application Data

(60) Provisional application No. 60/732,690, filed on Nov. 1, 2005.

(51) Int. Cl.
    *H01S 3/22*     (2006.01)
(52) U.S. Cl. .......................... 372/55; 372/57
(58) Field of Classification Search .................. 372/55, 372/57
    See application file for complete search history.

(56) References Cited

U.S. PATENT DOCUMENTS

| | | | |
|---|---|---|---|
| 3,593,189 A | 7/1971 | Buhrer | 331/94.5 |
| 3,989,360 A | 11/1976 | Duchet | 350/319 |
| 4,223,279 A | 9/1980 | Bradford, Jr. et al. | 331/94.5 |
| 4,455,658 A | 6/1984 | Sutter, Jr. | 372/38 |
| 4,697,270 A | 9/1987 | Galkowski | 372/34 |
| 4,798,467 A | 1/1989 | Wyeth et al. | 356/349 |
| 4,817,101 A | 3/1989 | Wyeth et al. | 372/32 |
| 4,823,354 A | 4/1989 | Znotins et al. | 372/57 |
| 4,881,231 A | 11/1989 | Jain | 372/32 |
| 4,883,352 A | 11/1989 | Bruning | 353/122 |
| 4,940,331 A | 7/1990 | Wyeth et al. | 356/349 |
| 4,959,840 A | 9/1990 | Akins et al. | 372/57 |
| 5,023,884 A | 6/1991 | Akins et al. | 372/57 |
| 5,025,445 A | 6/1991 | Anderson et al. | 372/20 |
| 5,025,446 A | 6/1991 | Kuizenga | 372/21 |
| 5,083,093 A | 1/1992 | Adler et al. | 328/65 |
| 5,095,292 A | 3/1992 | Masterton | 333/26 |
| 5,095,492 A | 3/1992 | Sandstrom | 372/102 |
| 5,128,601 A | 7/1992 | Orbach et al. | 372/30 |
| 5,189,678 A | 2/1993 | Ball et al. | 372/28 |
| 5,315,611 A | 5/1994 | Ball et al. | 372/56 |

(Continued)

FOREIGN PATENT DOCUMENTS

JP     63217687     9/1988

(Continued)

*Primary Examiner*—Dung T. Nguyen
(74) *Attorney, Agent, or Firm*—William Cray

(57) ABSTRACT

A gas discharge laser and method of operating same is disclosed which may comprise a gas discharge laser chamber support structure comprising a first support arm attached to a mounting table; a gas discharge laser chamber slideably engaging the first support arm; an first optical element sensitive to chamber vibration positioned at a first end of the laser chamber mounted on the mounting table; the laser chamber support structure being without connection to the first optical element. The apparatus and method may also comprise a second optical element sensitive to chamber vibration positioned at the second end of the laser chamber mounted on the mounting table; the laser chamber support structure being without connection to the second optical element. The first optical element may comprise a line narrowing optical arrangement and the second optical element comprising an output coupler.

18 Claims, 7 Drawing Sheets

U.S. PATENT DOCUMENTS

| | | | |
|---|---|---|---|
| 5,371,587 A | 12/1994 | De Groot et al. | 356/349 |
| 5,373,515 A | 12/1994 | Wakabayashi et al. | 372/20 |
| 5,420,877 A | 5/1995 | Sandstrom | 372/34 |
| 5,440,578 A | 8/1995 | Sandstrom | 372/59 |
| 5,448,580 A | 9/1995 | Birx et al. | 372/38 |
| 5,450,207 A | 9/1995 | Fomenkov | 356/416 |
| 5,524,144 A | 6/1996 | Suzuki | 359/176 |
| 5,656,882 A | 8/1997 | Lazarus et al. | 310/328 |
| 5,691,989 A | 11/1997 | Rakuljic | 372/20 |
| 5,706,301 A | 1/1998 | Lagerstrom | 372/32 |
| 5,754,571 A | 5/1998 | Endoh et al. | 372/20 |
| 5,770,933 A | 6/1998 | Larson et al. | 318/254 |
| 5,771,258 A | 6/1998 | Morton et al. | 372/57 |
| 5,835,520 A | 11/1998 | Das et al. | 328/65 |
| 5,848,089 A | 12/1998 | Sarkar et al. | 372/58 |
| 5,852,621 A | 12/1998 | Sandstrom | 372/25 |
| 5,852,627 A | 12/1998 | Ershov | 372/108 |
| 5,870,420 A | 2/1999 | Webb | 372/58 |
| 5,898,725 A | 4/1999 | Fomenkov et al. | 372/102 |
| 5,953,360 A | 9/1999 | Vitruk et al. | 372/87 |
| 5,978,394 A | 11/1999 | Newman et al. | 372/32 |
| 5,978,405 A | 11/1999 | Juhasz et al. | 372/57 |
| 5,978,409 A | 11/1999 | Das et al. | 372/100 |
| 5,991,324 A | 11/1999 | Knowles et al. | 372/57 |
| 6,005,879 A | 12/1999 | Sandstrom et al. | 372/25 |
| 6,018,537 A | 1/2000 | Hofmann et al. | 372/25 |
| 6,021,150 A | 2/2000 | Partio et al. | 372/57 |
| 6,028,879 A | 2/2000 | Ershov | 372/57 |
| 6,038,055 A | 3/2000 | Hansch et al. | 359/279 |
| 6,067,311 A | 5/2000 | Morton et al. | 372/57 |
| 6,078,599 A | 6/2000 | Everage et al. | 372/20 |
| 6,094,448 A | 7/2000 | Fomenkov et al. | 372/102 |
| 6,104,735 A | 8/2000 | Webb | 372/37 |
| 6,109,574 A * | 8/2000 | Pan et al. | 248/176.1 |
| 6,128,323 A | 10/2000 | Myers et al. | 372/38.1 |
| 6,163,559 A | 12/2000 | Watson | 372/102 |
| 6,164,116 A | 12/2000 | Rice et al. | 73/1.72 |
| 6,192,064 B1 | 2/2001 | Algots et al. | 372/99 |
| 6,208,674 B1 | 3/2001 | Webb et al. | 372/57 |
| 6,208,675 B1 | 3/2001 | Webb | 372/58 |
| 6,212,217 B1 | 4/2001 | Erie et al. | 372/102 |
| 6,219,368 B1 | 4/2001 | Govorkov | 372/59 |
| 6,240,110 B1 | 5/2001 | Ershov | 372/20 |
| 6,240,112 B1 | 5/2001 | Partlo et al. | 372/57 |
| 6,243,405 B1 | 6/2001 | Borneis et al. | 372/57 |
| 6,263,002 B1 | 7/2001 | Hsu et al. | 372/6 |
| 6,317,447 B1 | 11/2001 | Partlo et al. | 372/57 |
| 6,348,357 B2 | 2/2002 | Sano | 438/16 |
| 6,404,158 B1 | 6/2002 | Boisvert et al. | 318/469 |
| 6,477,193 B2 | 11/2002 | Oliver et al. | 372/58 |
| 6,493,364 B1 | 12/2002 | Baumler et al. | 372/15 |
| 6,493,374 B1 | 12/2002 | Fomenkov et al. | 372/102 |
| 6,496,528 B2 | 12/2002 | Titus et al. | 372/102 |
| 6,529,531 B1 | 3/2003 | Everage et al. | 372/20 |
| 6,529,533 B1 | 3/2003 | Vos | 372/29.01 |
| 6,532,247 B2 | 3/2003 | Spangler et al. | 372/57 |
| RE38,054 E | 4/2003 | Hofmann et al. | 372/25 |
| 6,650,666 B2 | 11/2003 | Spangler et al. | 372/20 |
| 6,671,294 B2 | 12/2003 | Kroyan et al. | 372/20 |
| 6,721,340 B1 | 4/2004 | Fomenkov et al. | 372/25 |
| 6,738,410 B2 | 5/2004 | Partlo et al. | 372/100 |
| 6,760,358 B1 | 7/2004 | Zimmermann et al. | 372/101 |
| 6,778,584 B1 | 8/2004 | Partlo et al. | 372/99 |
| 6,853,653 B2 | 2/2005 | Spangler et al. | 372/20 |
| 2002/0167986 A1 | 11/2002 | Pan et al. | 372/55 |

FOREIGN PATENT DOCUMENTS

| | | |
|---|---|---|
| JP | 64-042564 | 2/1989 |
| JP | 03-217062 | 9/1991 |
| JP | 04-305987 | 10/1992 |
| JP | 04-314374 | 11/1992 |
| JP | 04076976 | 11/1992 |
| JP | 05-167172 | 7/1993 |
| JP | 06-005952 | 1/1994 |
| JP | 06-021543 | 1/1994 |
| JP | 06-152007 | 5/1994 |
| JP | 10-284790 | 10/1998 |
| JP | 2000-058944 | 2/2000 |
| JP | 11-035615 | 8/2000 |
| JP | 2002-509363 | 3/2002 |
| WO | WO99/31773 | 6/1999 |

* cited by examiner

EXTERNAL OPTICS AND CHAMBER SUPPORT SYSTEM

RELATED APPLICATIONS

This application claims priority to U.S. Provisional Application Ser. No. 60/732,690, filed on Nov. 1, 2005 and entitled EXTERNAL OPTICS AND CHAMBER SUPPORT SYSTEM and is incorporated by reference herein.

The present application is related to co-pending U.S. patent application Ser. No. 11/173,955, entitled GAS DISCHARGE LASER LINE NARROWING MODULE, filed on Jun. 30, 2005 and assigned to the common assignee of the present application, the disclosure of which is hereby incorporated by reference.

FIELD OF THE INVENTION

The present invention related to high pulse repetition rate line narrowed gas discharge laser systems operating at, e.g., around 6 kHz and above with requirements for certain laser system output light beam pulse parameters, e.g., bandwidth, of maintenance in a range of about 0.12 pm, e.g., at full width half max (FWHM) and about 0.3-0.4 pm 95% energy integral (E95), e.g., and for pulse to pulse stability requirements on the order of around 5-10% of those numbers.

BACKGROUND OF THE INVENTION

The present invention related to high pulse repetition rate line narrowed gas discharge laser systems operating at, e.g., around 6 kHz and above with requirements for certain laser system output light beam pulse parameters, e.g., bandwidth, of maintenance in a range of about 0.5 pm, e.g., at full width half max (FWHM) and about 1.2 pm 95% energy integral (E95), e.g., and for pulse to pulse stability requirements on the order of around 5-10% of those numbers.

Beam quality requirements, e.g., for bandwidth control require improvements in the optical train mounting system, e.g., to reduce laser system operation induced variations to the respective beam quality parameter, e.g., due to laser system vibration coupling into one or more key elements of the optical train, e.g. the output coupler and/or the line narrowing unit, e.g., in a single chamber laser system or in the seed pulse generating master oscillator of a master oscillator—power amplifier (MOPA) or master oscillator—power oscillator (MOPO) laser system.

According to aspects of an embodiment of the present invention, applicant proposes solutions to the foregoing referenced shortcoming of existing systems.

SUMMARY OF THE INVENTION

A gas discharge laser and method of operating same is disclosed which may comprise a gas discharge laser chamber support structure comprising a first support arm attached to a mounting table; a gas discharge laser chamber slideably engaging the first support arm; an first optical element sensitive to chamber vibration positioned at a first end of the laser chamber mounted on the mounting table; the laser chamber support structure being without connection to the first optical element. The apparatus and method may also comprise a second optical element sensitive to chamber vibration positioned at the a second end of the laser chamber mounted on the mounting table; the laser chamber support structure being without connection to the second optical element. The first optical element may comprise a line narrowing optical arrangement and the second an the second optical element comprising an output coupler. The first and second optical elements may each respectively be attached to a mounting support clamp assembly respectively connected to the mounting table by a respective mounting bracket. The gas discharge laser chamber support structure may a second support arm and the gas discharge laser chamber slideably engaging the second support arm. The gas discharge laser may slideably engage at least one of the first and second support arms through at least one wheel and track arrangement adapted to position the gas discharge laser chamber vis a vis at lease one of the first and second optical elements along an optical axis of the gas discharge laser system. The gas discharge laser chamber support assembly may be aligned to the respective mounting clamp of the first optical element and the second optical element by an alignment rod passing through the first support arm and the second support arm and the respective mounting clamp.

DETAILED DESCRIPTION OF PREFERRED EMBODIMENTS

Figure 1:
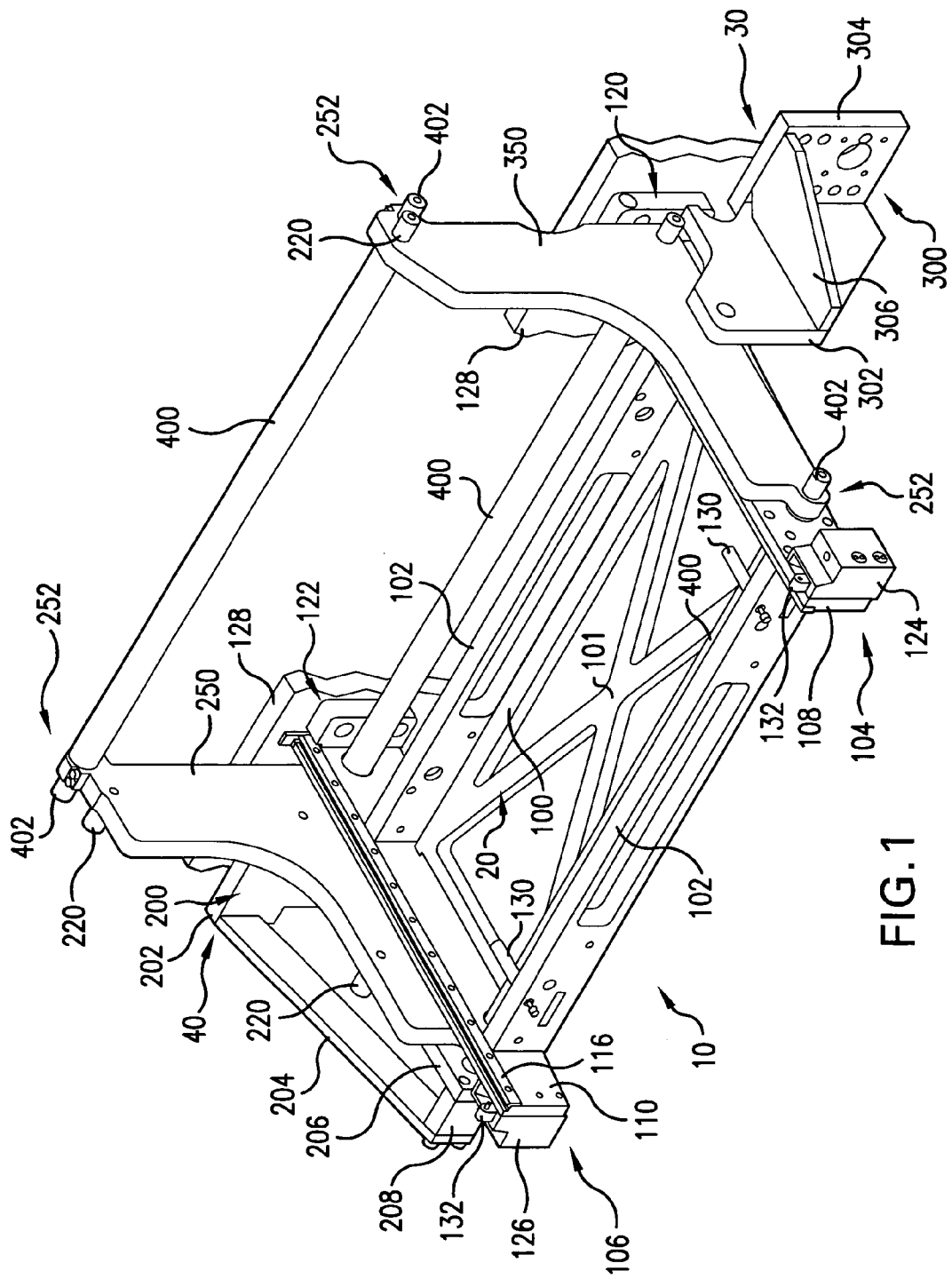
FIG. 1 shows an orthogonal perspective view of an example of an optics and chamber mounting system according to aspects of an embodiment of the present invention.
Figure 3:
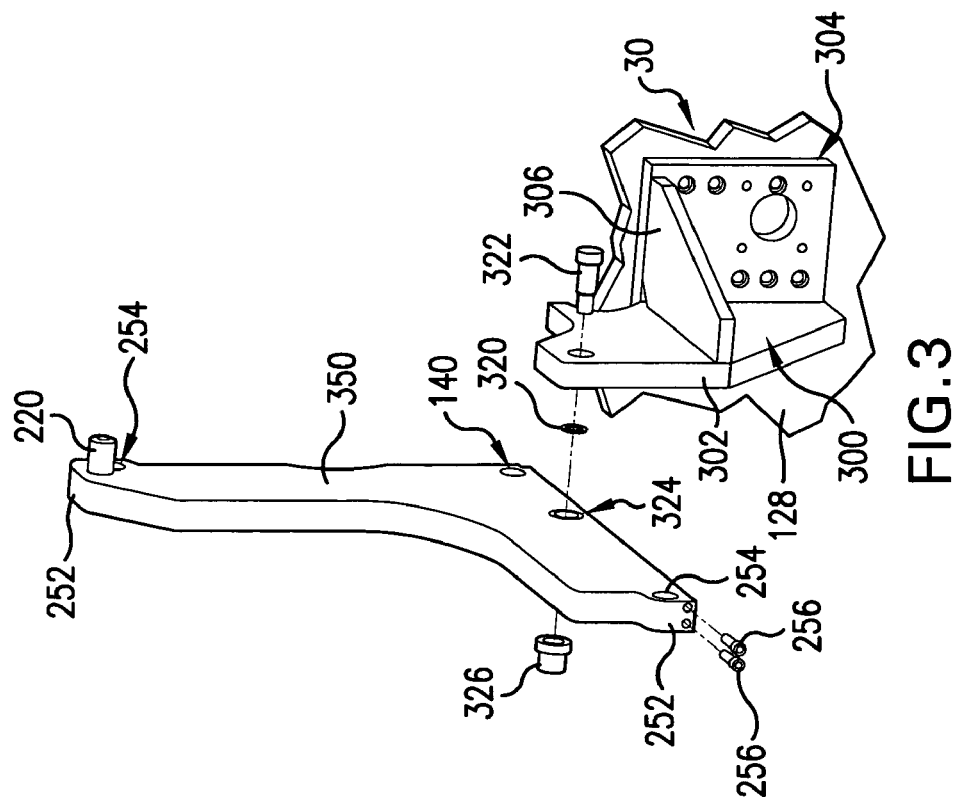
FIG. 3 shows an orthogonal perspective view of an output coupler optic support system according to aspects of an embodiment of the present invention.

Turning now to FIG. 1 there is shown by way of example an external optics and chamber support system 10 according to aspects of an embodiment of the present invention. The external optics and chamber support system 10 may comprise, e.g., a chamber support system 20, an output coupler support system 30 and a line narrowing unit/package/module (LNM) support system 40.

The chamber support system may comprise, e.g., a chamber mount axial support plate 100, having, e.g., an x-beam structure 101 for structural stiffness in the longitudinal and lateral axes, with lighter weight construction. The chamber support system 20 may also comprise a pair of chamber support tie bars 102, which may be attached, by suitable means, e.g., by screws (not shown) to a right support assembly support arm 104 and a left support assembly support arm 106. The right support assembly support arm 104 may include a right arm support bar 108 and the left support assembly support arm 106 may include a left support bar 110. Each of the right support assembly support arm 104 and the left support assembly support arm 106 may include a slot 112.

Into the slot 112 on the right support bar 108 may be inserted a chamber support flat rail 114 and into the slot 112 on the left support bar 110 may be inserted a chamber support v-rail 116. As is known in the art, the chamber support v-rail may be used to align the laser chamber (not shown) to the chamber support system 20, e.g., by the use of v-grooved wheels that mate with the v-rail and precisely position the chamber (not shown), e.g., in a longitudinal axis, with the v-rail and thus the rest of the chamber support system 20.

A right support assembly support arm mount assembly 120 may be used to mount, by suitable means, e.g., screws (not shown) the right support assembly support arm 104 to an optical table 128, parts of which are shown in partly cut-away form, e.g., in FIGS. 1, 2, 3 and 5. Similarly, a left support assembly support arm mount assembly 122 may be used to mount, by suitable means, e.g., screws (not shown) the left support assembly support arm 106 to the optical table 128.

A right support assembly support arm cart locking member base 124 may be attached by suitable means, e.g., screws (not shown) to the right support arm 108 and a left support assembly support arm cart locking member base 126 may be attached, by suitable means, e.g., screws (not shown) to the left support arm 110. The cart locking member bases 124, 126 may support spring loaded cart locking mechanisms 132, which may have a spring loading mechanism (not shown) and may serve to hold the chamber (not shown) in place laterally (in a direction generally orthogonal to the path of the laser light pulse beam through the chamber (not shown)) when the chamber is positioned on the chamber support system 20.

A pair of adjustable metric shock absorbers 130 may be attached to one of the chamber support tie bars 102 and be used, e.g., to prevent the chamber (not shown) from traveling to fast and/or to far along the tracks 114, 116 when the chamber is installed, e.g., by engaging a stop plate (not shown) on the chamber as it is inserted into the chamber support system. Thus, the shock absorbers 130 may be used to, e.g., prevent damage to the chamber or support system upon installation of the chamber (not shown). The support arms 108, 110 may also have formed in them optic frame rod openings 140, the use of which will be explained in more detail below.

Figure 2:
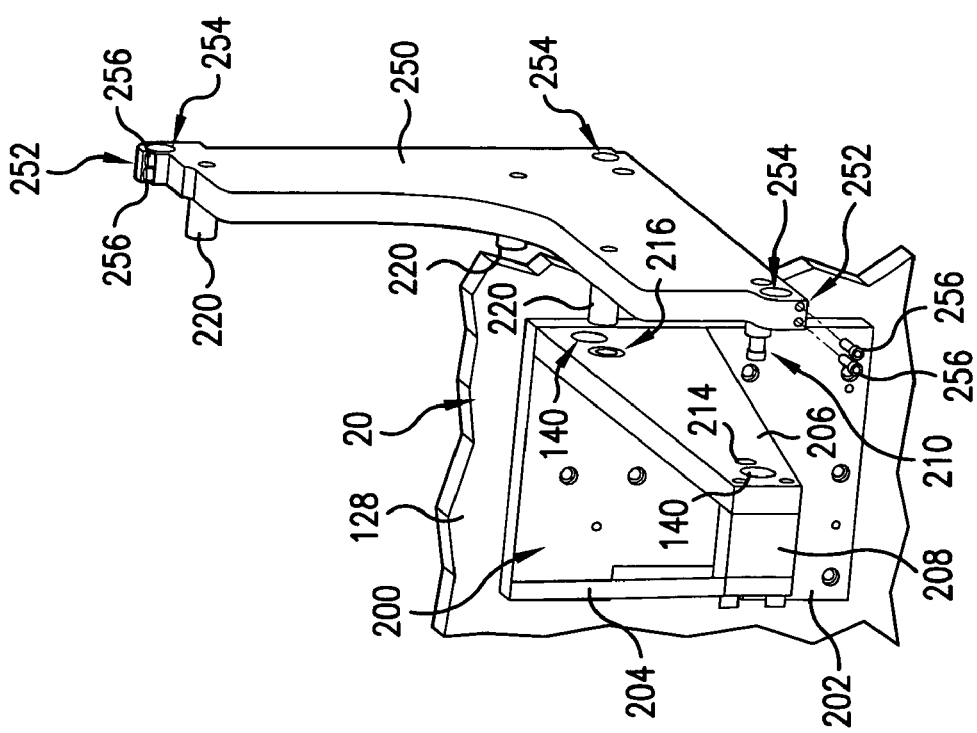
FIG. 2 shows an orthogonal perspective view of a line narrowing module (LNM) optic support system according to aspects of an embodiment of the present invention.
Figure 5:
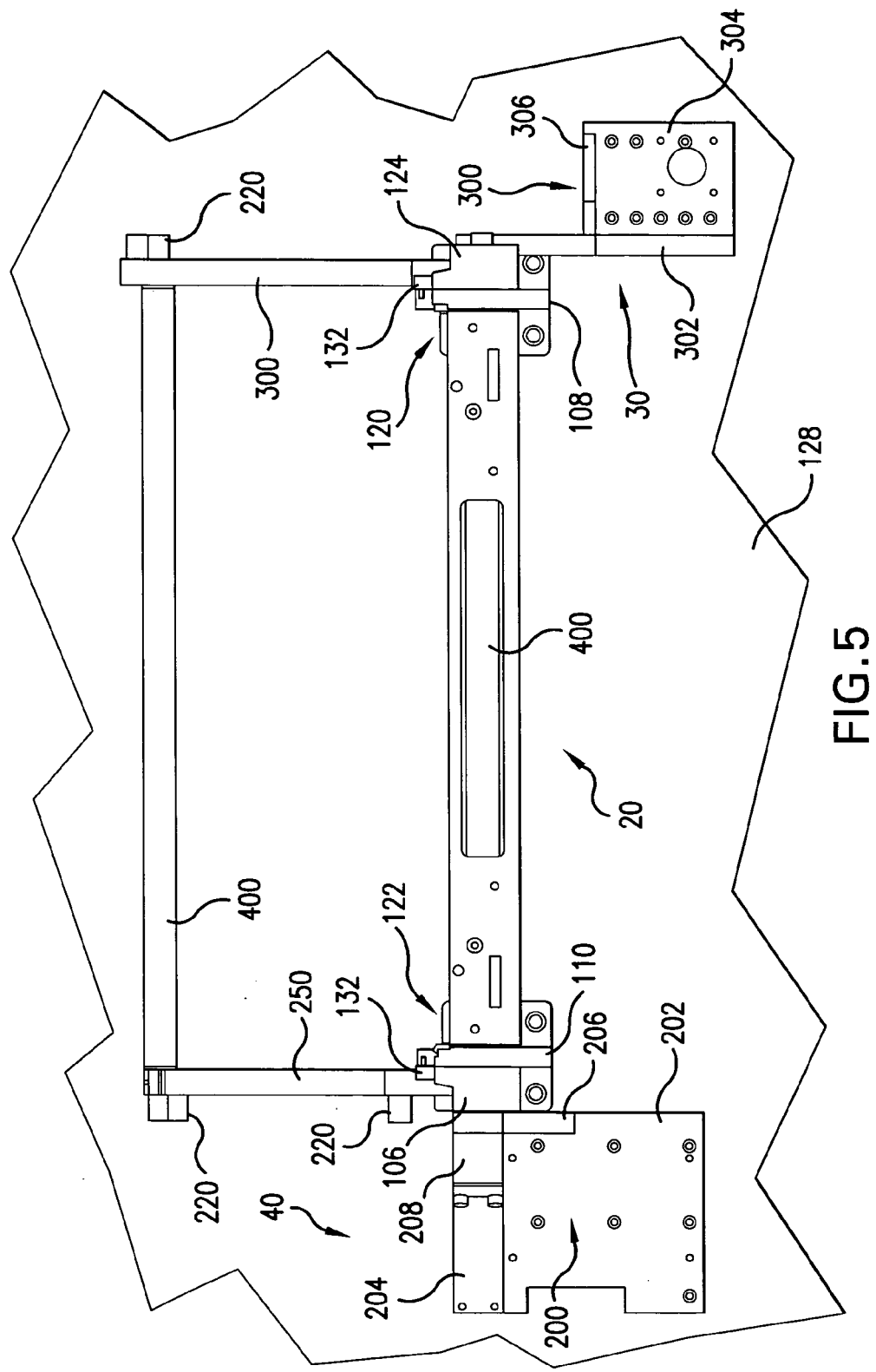
FIG. 5 shows a front view of the apparatus of FIG. 1.
Figure 6:
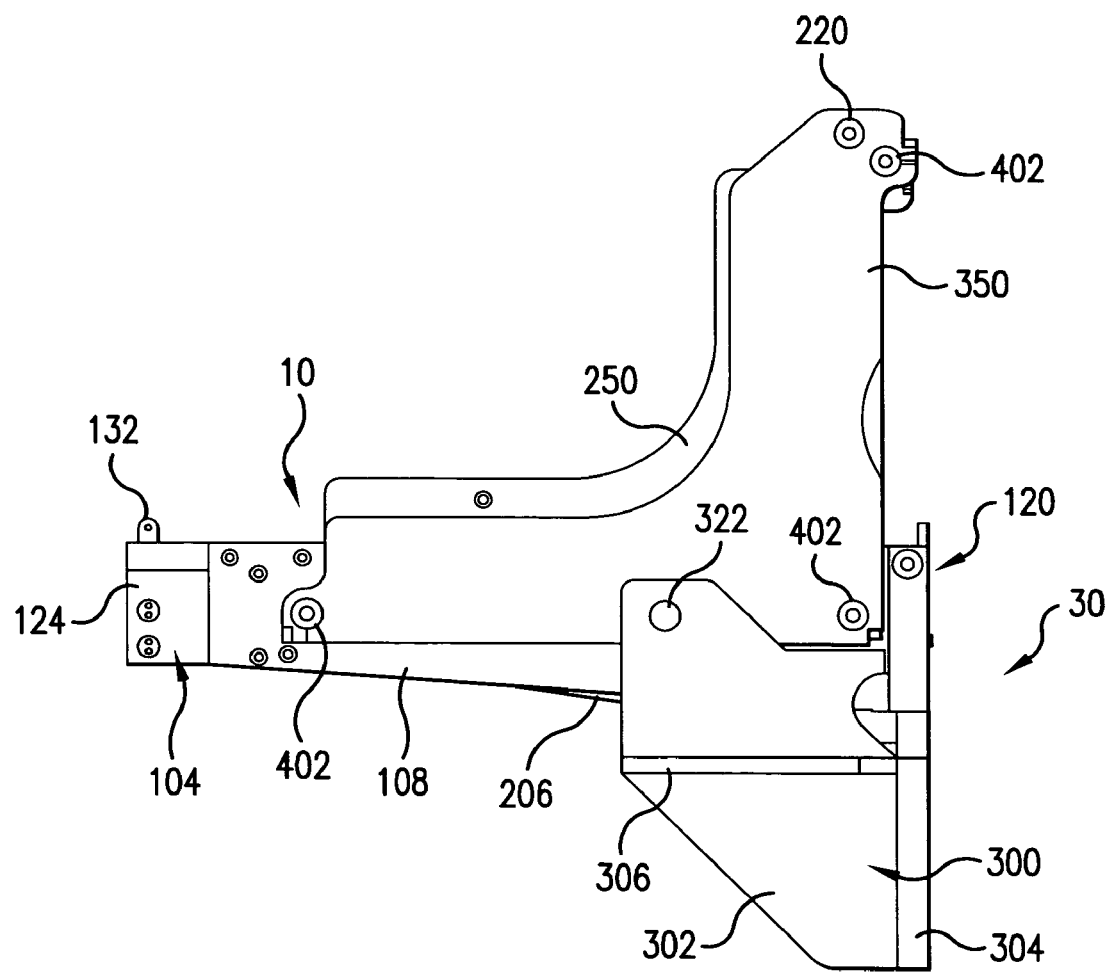
FIG. 6 shows a side view of the apparatus of FIG. 1.

Turning now to FIGS. 1, 2 and 5 there is shown by way of example and according to aspects of an embodiment of the present invention, a line narrowing unit/package/module (LNM) support system 40, which may comprise an LNM support bracket assembly 200, which may include a LNM support system plate assembly 202, a bracket assembly arm 204 and a bracket assembly arm 206 and a bracket front plate 208.

An LNM optic support clamp assembly 250 may comprise a first and a second optic frame rod clamp mechanism 252, which may serve to clamp a respective one of a plurality, e.g., of three optic frame rods 400 to the optic frame rod clamp mechanism 250, e.g., by tightening screws 256 to clamp the clamp mechanism around a reduced diameter portion of the respective optic frame rod 400 into an optic frame rod clamp opening 254.

A locator pin 210 may be press fit into an opening in the clamp assembly 250 and may serve to locate the clamp assembly with respect to the bracket arm 206, e.g., by pres fitting into a bushing 214 in the bracket arm 206 to position the clamp mechanism 250 with respect to the bracket arm 206 and thus the entire assembly 200. A similar attachment, e.g., with another locator pin (not shown) may be press fit into a horizontally slotted bushing 216 (shown in FIG. 2) in the bracket 206 and position and suspend the clamp mechanism with respect to the bracket arm 206 through attachment in a connection hole (not shown) in the clamping mechanism 250 wall facing the bracket 206. the slot allows for some horizontal thermal expansion without allowing vertical movement of the clamping mechanism 250 vis-a-vis the bracket 206. Standoffs 220 may assist in positioning the LNM 42 (shown in FIG. 8) with respect to the LNM clamping mechanism 250.

According to aspects of an embodiment of the present invention an output coupler support system 40 may comprise an output coupler support system mounting bracket assembly 300, which may include an output coupler support system bracket assembly arm 302, a bracket plate 304 and an out coupler support system output coupler support bracket 306. A shaft spacer 320 and a shoulder screw 322 may serve to connect the output coupler clamp mechanism 350 to the mounting bracket assembly 300, e.g., by the screw 322 being screwed through a spherical washer 324 and into a hex nut 326 on the opposite side of the clamping mechanism 350. This arrangement also allows, e.g., some thermal expansion of the connection of the clamping member 350 and the bracket assembly 300, e.g., vis-a vis each other.

The output coupler optic support clamp assembly 350 may also be clamped to respective ones of the optic frame support rods 400 by engaging a respective narrowed diameter portion of a respective rod 400 in a respective clamp member 252 clamping opening 254 and tightening the screws 256.

Figure 4:
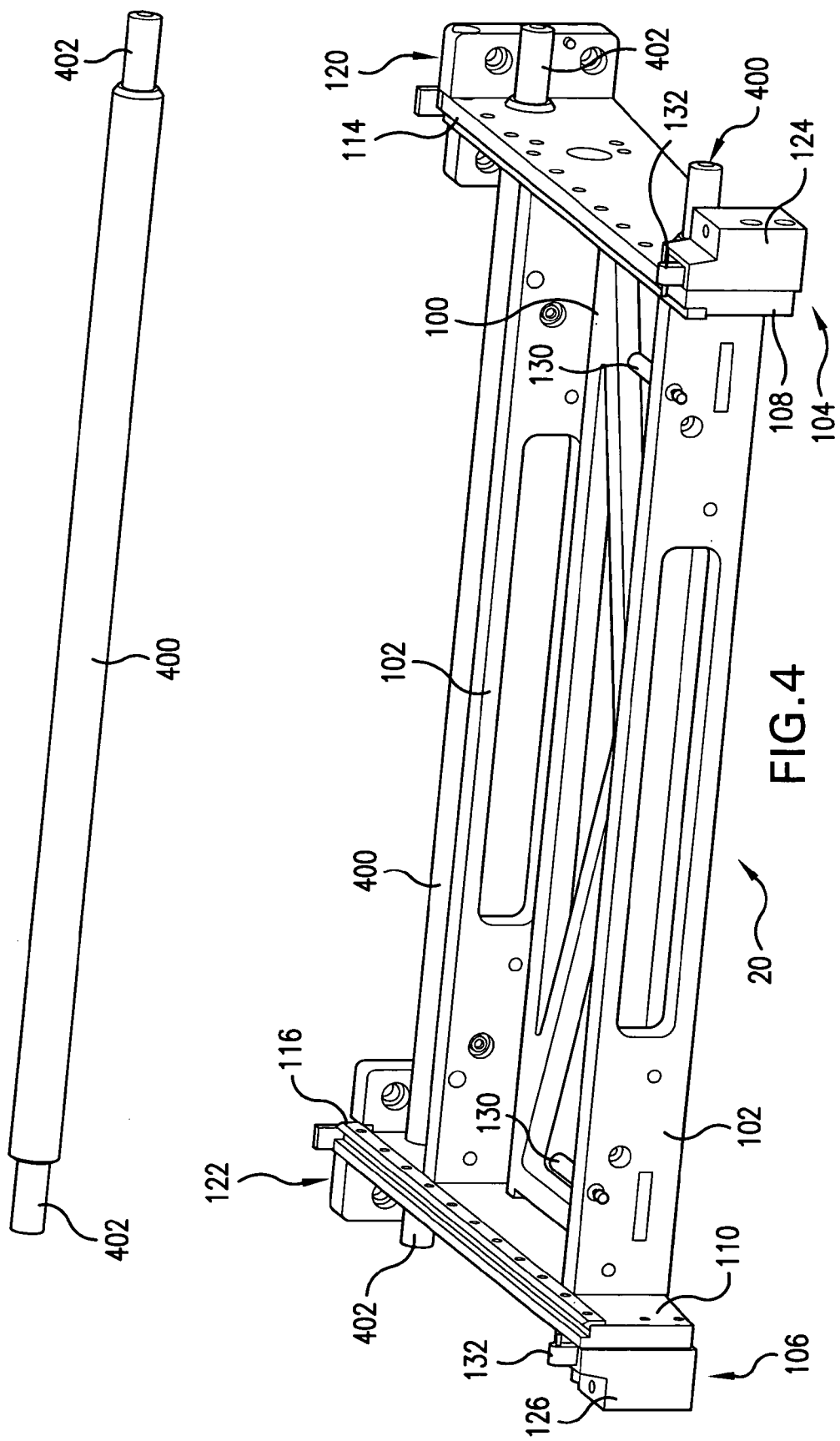
FIG. 4 shows an orthogonal perspective view of a chamber mount according to aspects of an embodiment of the present invention.
Figure 7:
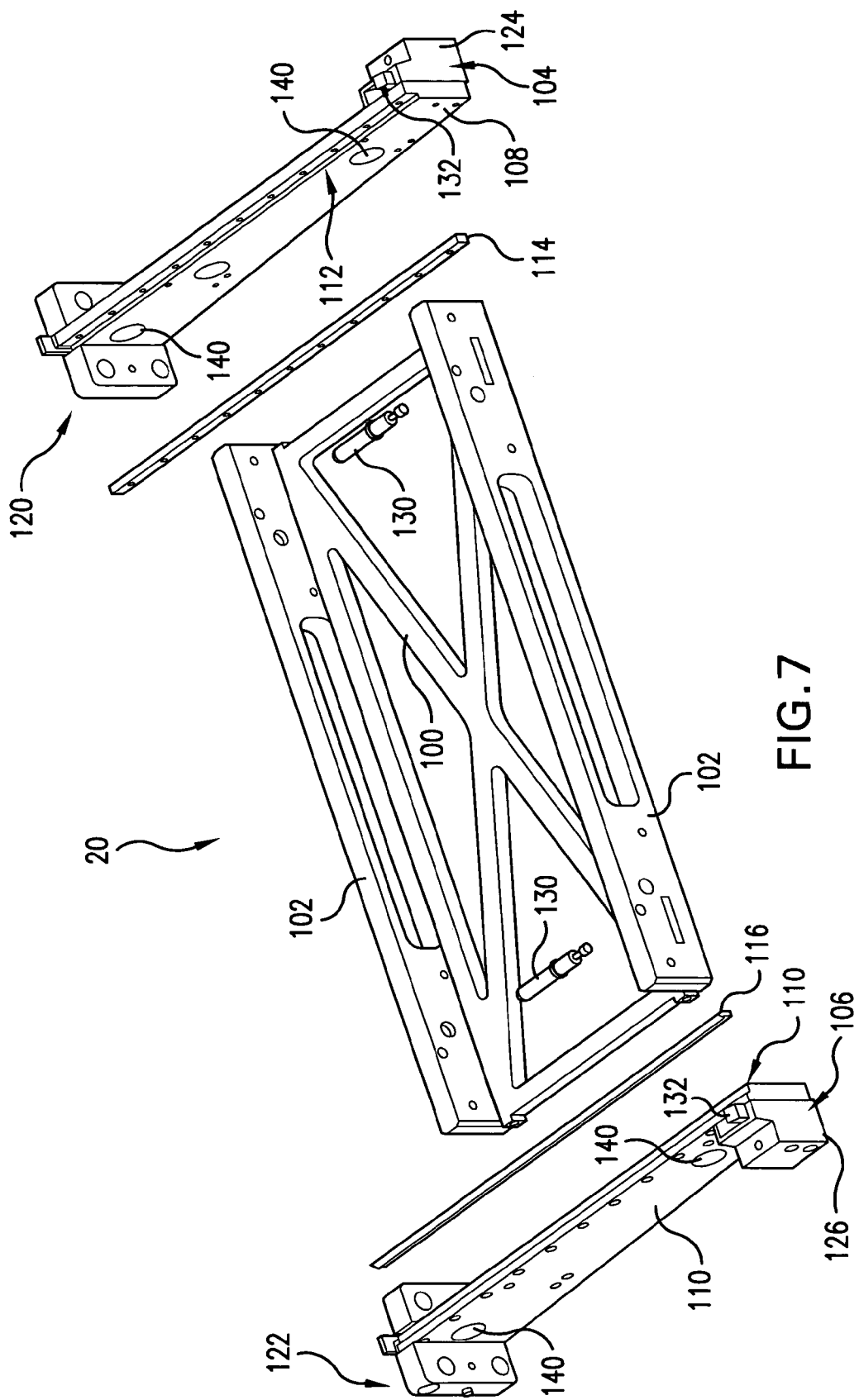
FIG. 7 shows an exploded orthogonal perspective view of the chamber mount system of FIG. 4.
Figure 8:
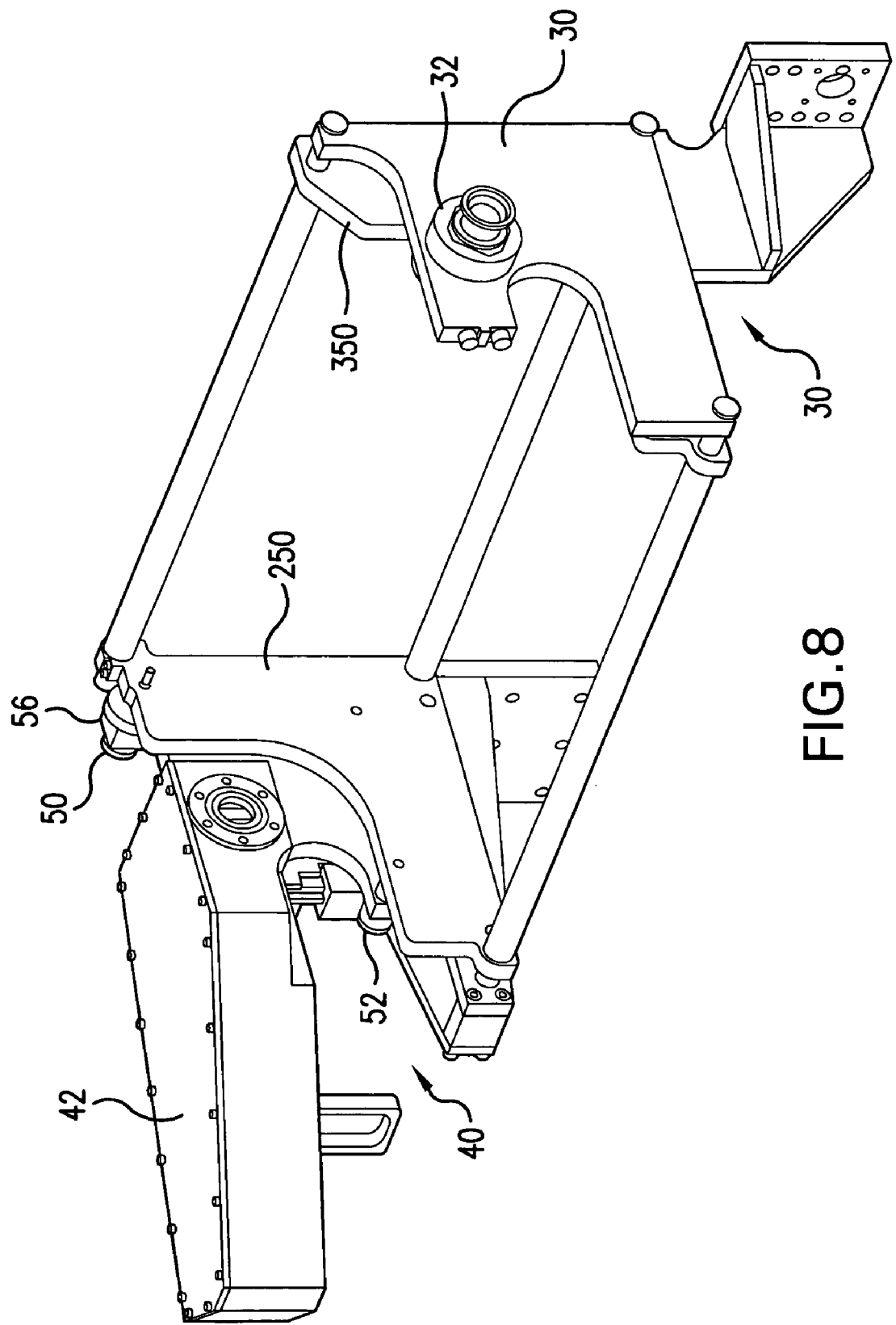
FIG. 8 shows an orthogonal perspective view of the optics and chamber mount system of FIG. 1 with an LNM and output coupler attached.

It will be understood by those skilled in the art that in this manner of construction of the external chamber and optic support system 10 according to aspects of an embodiment of the present invention, the optic supports, e.g., as illustrated in FIG. 8, supporting the LNM 42 and the output coupler 32 is independent of direct connection to the chamber support system 20, which is shown, e.g., separately in FIG. 4 and in exploded view in FIG. 7. Contrary to the former arrangement in applicant's assignee's laser systems, the clamping mechanisms 250, 350 are not connected to the chamber system support arms 108, 110. The LNM 42, may be connected to the LNM clamping mechanism 250, e.g., by finger operated screws, 50, 52, the former of which may be a part of an LNM 42 tilting mechanism 56, e.g., like that described in the above referenced co-pending U.S. patent application Ser. No. 11/173,955, is also not directly connected to the chamber support system 20. The frame support rods 400, which may be constructed of Invar, e.g., for excellent rigidity and very low coefficient of thermal expansion, pass through the support arms 108 and 110 through openings 140, but to not physically contact the arms 108, 110. The openings 140 are sufficiently large to allow such passage without physical contact.

Therefore vibration of the chamber support system 20, e.g., due to operation of the gas circulation fan (not shown) within the chamber (not shown), or simply the gas discharges themselves, etc. is not transmitted either to the LNM clamping mechanism 250 or the output coupler clamping mechanism 350 or, therefore, to the LNM 42 itself or to the output coupler 32 itself. The LNM 42 and output coupler 32, and other optical elements and the chamber mounting system 20 are all mounted to the optical table, e.g., for aide in meeting appropriate alignment specifications. However, the optical table is of sufficient size and mass that vibration is not transmitted through the optical table sufficiently to cause vibrationally related optics alignment or transient problems.

It will be understood by those skilled in the art that according to aspects of an embodiment of the present invention a plurality, e.g., three, of the invar rods 400 may serve to locate the output coupler clamp mechanism 350 and the LNM clamp mechanism 250 to each other. Tight manufacturing tolerances and very small coefficient of thermal expansion serves to insure that the clamp mechanisms 250 and 350 planes remain perpendicular to each other, and thus, also the LNM 42 and output coupler 32 interface planes remain perpendicular to the optical axis of the laser system and parallel to each other in an axis orthogonal to the optical axis.

The clamp mechanisms 250, 350 are aligned with the chamber support assembly 20 but are supported by the respective bracket support assemblies 200, 300 and not by the chamber support assembly 20 as was the case in the past. These support assemblies, which may be made from stainless steel, isonate the vibrations of the chamber from the clamping mechanisms 250, 350 and, therefore, also isolate the LNM 42 and output coupler 32 respectively attached to the clamp mechainsm 250, 350.

It will be understood by those skilled in the art that a gas discharge laser and method of operating same is disclosed above, which may comprise a gas discharge laser chamber support structure comprising a first support arm attached to a mounting table; a gas discharge laser chamber slideably engaging the first support arm; an first optical element sensitive to chamber vibration positioned at a first end of the laser chamber mounted on the mounting table; the laser chamber support structure being without connection to the first optical element. The apparatus and method may also comprise a second optical element sensitive to chamber vibration positioned at the a second end of the laser chamber mounted on the mounting table; the laser chamber support structure being without connection to the second optical element. The first optical element may comprise a line narrowing optical arrangement and the second an the second optical element comprising an output coupler. The first and second optical elements may each respectively be attached to a mounting support clamp assembly respectively connected to the mounting table by a respective mounting bracket. The gas discharge laser chamber support structure may a second support arm and the gas discharge laser chamber slideably engaging the second support arm. The gas discharge laser may slideably engage at least one of the first and second support arms through at least one wheel and track arrangement adapted to position the gas discharge laser chamber vis a vis at lease one of the first and second optical elements along an optical axis of the gas discharge laser system. The gas discharge laser chamber support assembly may be aligned to the respective mounting clamp of the first optical element and the second optical element by an alignment rod passing through the first support arm and the second support arm and the respective mounting clamp. The alignment may be accomplished with little or not vibration transferred from the laser chamber support structure to the optical element(s), e.g., with a relatively tight fit for alignment purposes, but no physical contact, at least none that will transfer vibration, e.g., in the axis of the alignment rods, generally parallel to the optical axis.

According to aspects of an embodiment of the present invention as just described, the functions of the respective mountings to align the respective elements with each other and the optical axis, and mounting the respective elements to the laser system support frame, to which the mounting table is attached, while not allowing the transfer of vibration from the chamber to the respective optical elements. The optical elements may be very sensitive to chamber vibration, especially at the high pulse repetition rates and strict output laser light parameter(s) quality requirements for today's and future utilizations of such laser systems, e.g., as light sources for DUV integrated circuit photolithography wafer exposure processes. This is as opposed to prior laser systems, e.g., as made and sold by applicant's assignee Cymer, Inc. where such alignment and mounting was accomplished by, e.g., attaching the optical elements to the chamber support arrangement, e.g., to the support arm(s). Significant reduction in transmission of vibration from the chamber (which contains, e.g., a laser gas circulating fan operating at upwards of around 3000 RPM) to the optical elements, e.g., a line narrowing module and/or an output coupler is attained. Vibration transmitted to either or both of these optical elements can significantly detract from the laser performance, e.g., in the areas of beam parameter quality and the stability thereof, e.g., from pulse to pulse or over some time period, e.g., during a burst of pulses.

While the particular aspects of embodiment(s) of the EXTERNAL OPTICS AND CHAMBER SUPPORT SYSTEM described and illustrated in this patent application in the detail required to satisfy 35 U.S.C. §112 is fully capable of attaining any above-described purposes for, problems to be solved by or any other reasons for or objects of the aspects of an embodiment(s) above described, it is to be understood by those skilled in the art that it is the presently described aspects of the described embodiment(s) of the present invention are merely exemplary, illustrative and representative of the subject matter which is broadly contemplated by the present invention. The scope of the presently described and claimed aspects of embodiments fully encompasses other embodiments which may now be or may become obvious to those skilled in the art based on the teachings of the Specification. The scope of the present EXTERNAL OPTICS AND CHAMBER SUPPORT SYSTEM is solely and completely limited by only the appended claims and nothing beyond the recitations of the appended claims. Reference to an element in such claims in the singular is not intended to mean nor shall it mean in interpreting such claim element "one and only one" unless explicitly so stated, but rather "one or more". All structural and functional equivalents to any of the elements of the above-described aspects of an embodiment(s) that are known or later come to be known to those of ordinary skill in the art are expressly incorporated herein by reference and are intended to be encompassed by the present claims. Any term used in the specification and/or in the claims and expressly given a meaning in the Specification and/or claims in the present application shall have that meaning, regardless of any dictionary or other commonly used meaning for such a term. It is not intended or necessary for a device or method discussed in the Specification as any aspect of an embodiment to address each and every problem sought to be solved by the aspects of embodiments disclosed in this application, for it to be encompassed by the present claims. No element, component, or method step in the present disclosure is intended to be dedicated to the public regardless of whether the element, component, or method step is explicitly recited in the claims. No claim element in the appended claims is to be construed under the provisions of 35 U.S.C. §112, sixth paragraph, unless the element is expressly recited using the phrase "means for" or, in the case of a method claim, the element is recited as a "step" instead of an "act".

It will be understood by those skilled in the art that the aspects of embodiments of the present invention disclosed above are intended to be preferred embodiments only and not to limit the disclosure of the present invention(s) in any way and particularly not to a specific preferred embodiment alone. Many changes and modification can be made to the disclosed aspects of embodiments of the disclosed invention(s) that will be understood and appreciated by those skilled in the art. The appended claims are intended in scope and meaning to cover not only the disclosed aspects of embodiments of the present invention(s) but also such equivalents and other modifications and changes that would be apparent to those skilled in the art. In additions to changes and modifications to the disclosed and claimed aspects of embodiments of the present invention(s) noted above others could be implemented.

I claim:

1. A gas discharge laser comprising:
a gas discharge laser chamber support structure comprising a first support arm attached to a mounting table;
a gas discharge laser chamber slideably engaging the first support arm;
a first optical element sensitive to chamber vibration positioned at a first end of the laser chamber mounted on the mounting table;
the laser chamber support structure being without connection to the first optical element.

2. The apparatus of claim 1 further comprising:
a second optical element sensitive to chamber vibration positioned at the a second end of the laser chamber mounted on the mounting table;
the laser chamber support structure being without connection to the second optical element.

3. The apparatus of claim 1 further comprising:
the first optical element comprising a line narrowing optical arrangement.

4. The apparatus of claim 2 further comprising:
the first optical element comprising a line narrowing optical arrangement.

5. The apparatus of claim 3 further comprising:
the second optical element comprising an output coupler.

6. The apparatus of claim 4 further comprising:
the second optical element comprising an output coupler.

7. The apparatus of claim 5 further comprising:
the first and second optical elements are each respectively attached to a mounting support clamp assembly respectively connected to the mounting table by a respective mounting bracket.

8. The apparatus of claim 6 further comprising:
the gas discharge laser chamber support structure comprising a second support arm and the gas discharge laser chamber slideably engaging the second support arm.

9. The apparatus of claim 7 further comprising:
the gas discharge laser chamber support structure comprising a second support arm and the gas discharge laser chamber slideably engaging the second support arm.

10. The apparatus of claim 6 further comprising:
the gas discharge laser slideably engaging at least one of the first and second support arms through at least one wheel and track arrangement adapted to position the gas discharge laser chamber vis a vis at least one of the first and second optical elements along an optical axis of the gas discharge laser system.

11. The apparatus of claim 7 further comprising:
the gas discharge laser slideably engaging at least one of the first and second support arms through at least one wheel and track arrangement adapted to position the gas discharge laser chamber vis a vis at least one of the first and second optical elements along an optical axis of the gas discharge laser system.

12. The apparatus of claim 8 further comprising:
the gas discharge laser slideably engaging at least one of the first and second support arms through at least one wheel and track arrangement adapted to position the gas discharge laser chamber vis a vis at least one of the first and second optical elements along an optical axis of the gas discharge laser system.

13. The apparatus of claim 9 further comprising:
the gas discharge laser slideably engaging at least one of the first and second support arms through at least one wheel and track arrangement adapted to position the gas discharge laser chamber vis a vis at least one of the first and second optical elements along an optical axis of the gas discharge laser system.

14. The apparatus of claim 10 further comprising:
the gas discharge laser slideably engaging at least one of the first and second support arms through at least one wheel and track arrangement adapted to position the gas discharge laser chamber vis a vis at least one of the first and second optical elements along an optical axis of the gas discharge laser system.

15. The apparatus of claim 11 further comprising:
the gas discharge laser chamber support assembly is aligned to the respective mounting clamp of the first optical element and the second optical element by an alignment rod passing through the first support arm and the second support arm and the respective mounting clamp.

16. The apparatus of claim 12 further comprising:
the gas discharge laser chamber support assembly is aligned to the respective mounting clamp of the first optical element and the second optical element by an alignment rod passing through the first support arm and the second support arm and the respective mounting clamp.

17. The apparatus of claim 13 further comprising:
the gas discharge laser chamber support assembly is aligned to the respective mounting clamp of the first optical element and the second optical element by an alignment rod passing through the first support arm and the second support arm and the respective mounting clamp.

18. The apparatus of claim 14 further comprising:
the gas discharge laser chamber support assembly is aligned to the respective mounting clamp of the first optical element and the second optical element by an alignment rod passing through the first support arm and the second support arm and the respective mounting clamp.

* * * * *